Aug. 17, 1965   J. P. DUNN   3,201,065
ORBITAL VEHICLE DOCKING SYSTEM
Filed March 11, 1963   2 Sheets-Sheet 1
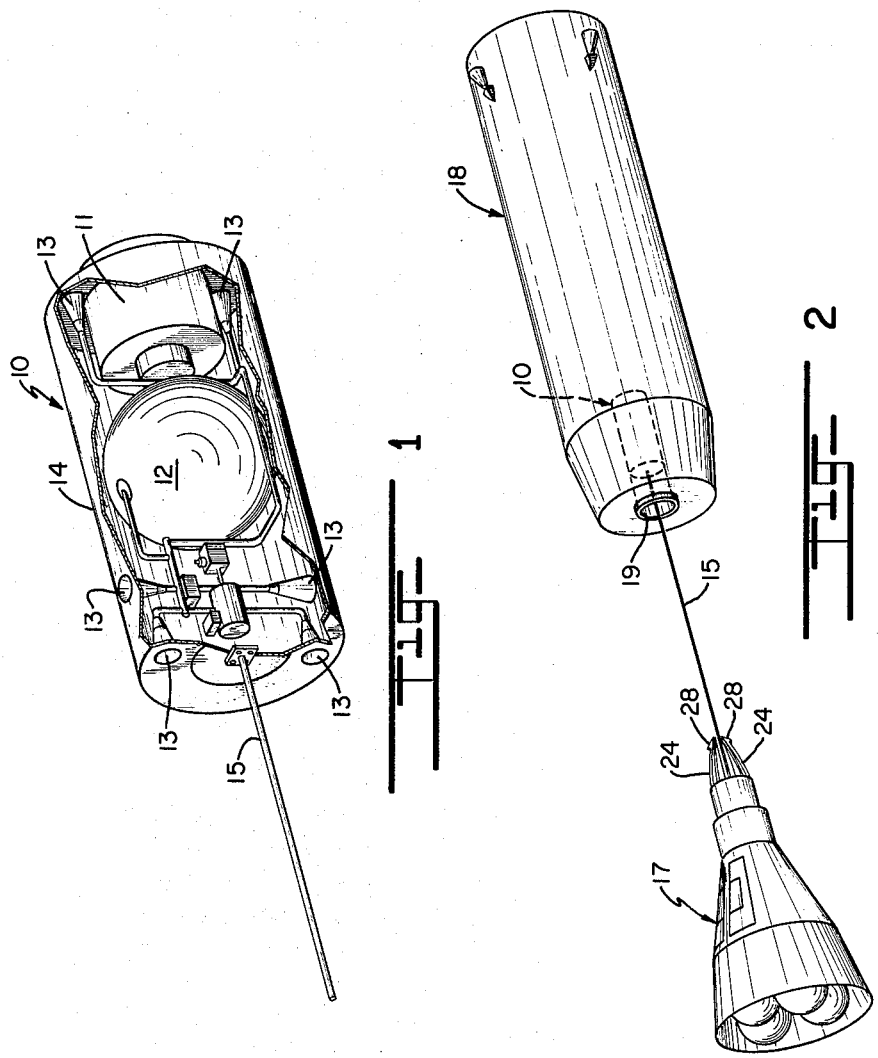
INVENTOR.
JOHN P. DUNN
BY
ATTORNEY

INVENTOR.
JOHN P. DUNN
ATTORNEY

United States Patent Office 3,201,065
Patented Aug. 17, 1965

3,201,065
ORBITAL VEHICLE DOCKING SYSTEM
John P. Dunn, Littleton, Colo., assignor to Martin-Marietta Corporation, Baltimore, Md., a corporation of Maryland
Filed Mar. 11, 1963, Ser. No. 264,110
4 Claims. (Cl. 244—1)

This invention relates to space station assembly or construction, and in particular to a system for bringing about final closure and docking of two orbiting space vehicles.

A suitable system for such final closure and docking should make provision for positive physical attachment of an interconnecting line between the two orbiting space vehicles before an attempt is made to achieve an actual structural connection between the vehicles. After a line of connection has been established, the two vehicles should be appropriately aligned and then structurally connected and hermetically sealed. The alignment operation preferably should be automatic and should correct any final closure errors.

The means for making attachment of an interconnecting line between the orbiting space vehicles to be docked should be universal to all of the space vehicles involved and should not be unduly elaborate. The docking system employed should be such as to permit either end of each vehicle to be docked with either end of any other space vehicle involved in the operation. The docking system preferably should be fully redundant to permit closure and docking of orbiting vehicles, even with the occurrence of a double system failure.

Furthermore, the final closure and docking system should be designed to be fail-safe and have in-flight repair capability. A vehicle release, or separation, feature should be incorporated in the system, which can be operated from either one of the two vehicles, and preferably provide a separate emergency release, when desired. In addition, the docking system should have the feature of permitting repeated rendezvous and docking without the necessity of making system component replacements. Finally, the system should be lightweight and relatively simple in construction and operation.

The provision of a positive, efficient method and system to control and achieve orbital vehicle rendezvous, final closure and sealed docking of two orbiting space vehicles has proven to be a problem of the greatest difficulty. A large number of different methods and systems have been proposed but in general, they have been found to be unsatisfactory for actual use in a manned space vehicle system. Presently contemplated space station concepts depend upon the capability of the vehicle guidance system to position the two space vehicles involved so that final rendezvous, closure and docking can be accomplished. The vehicle guidance system should be capable of aligning the two orbiting vehicles within an accuracy of ±1 ft. in pitch and yaw planes and within ±15° in the roll plane. Also, positive contact and control of the two vehicles should be maintainable until the vehicles come within approximately 25 ft. of each other.

Accordingly, it is an important object of this invention to provide a system for final closure and docking of two orbiting space vehicles which makes provision for positive physical attachment of an interconnecting line between the two rendezvously vehicles before an attempt is made to achieve actual structural connection and sealed docking therebetween.

Another object of this invention is to provide such a system which includes provision for automatic alignment of the two space vehicles during final closure thereof.

A further object of this invention is to provide an efficient, positive, lightweight, universal, safe and accurate system and method for rendezvous, final closure and hermetically sealed docking of two orbiting space vehicles.

Additional objects of the invention will become apparent from the following description, which is given primarily for purposes of illustration, and not limitation.

Stated in general terms, the objects of this invention are attained by providing a final closure and docking system for orbiting space vehicles which includes a rendezvous drone, which is launched from one of the two vehicles while remaining physically attached thereto by an interconnecting line or cable. The rendezvous drone is manually guided to the other of the two vehicles by signals traveling through the cable until it is sufficiently close for magnetic attraction of the drone to the other vehicle. The drone, by magnetic attraction, is automatically aligned with the other vehicle and is coupled thereto. By means of the cable interconnecting the first-mentioned vehicle and the drone-coupled vehicle, the two vehicles are slowly drawn together. As the two drawn vehicles near each other, mechanical alignment and connecting means are extended therefrom to complete the final closing operation. Docking and hermetic sealing of the two vehicles is accomplished by tightly drawing the two vehicles together mechanically and sealing two resilient seal rings by compression thereof.

A more detailed description of a specific embodiment of the invention is given below with reference to the accompanying drawings, wherein:

FIG. 1 is a schematic isometric view, with portions broken away, showing the rendezvous drone employed in a specific embodiment of the invention;

FIG. 2 is a similar view showing two orbiting space vehicles interconnected by a line and being drawn together;

Figure 3:
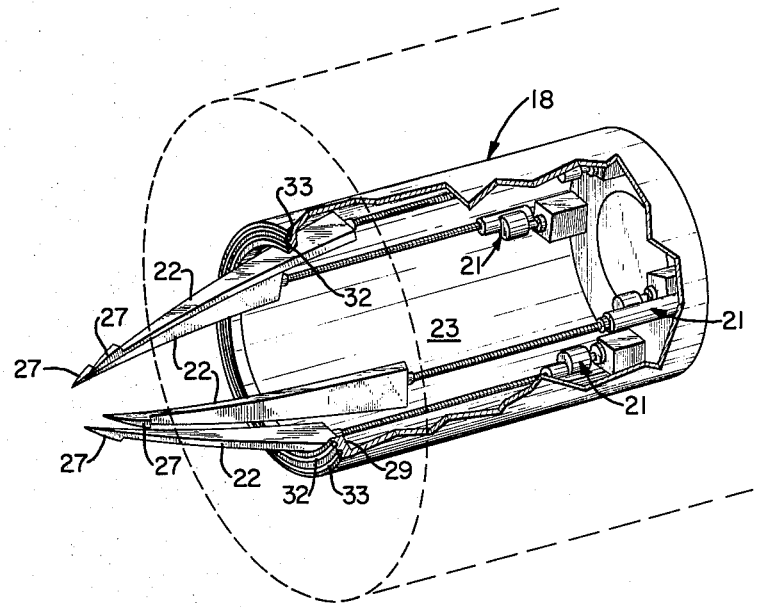
FIG. 3 is a similar view showing the mechanical alignment and connecting means mounted in an airlock of a space vehicle, with the vehicle shown in phantom.

In operation of the specific system of the invention shown in the drawings, a vehicle rendezvous guidance arrangement (not shown) is used to position the two orbiting space vehicles within a distance of approximately 10 to 50 ft. of each other at very low differential velocity. This is generally referred to as a "stand-off" maneuver. At this point a rendezvous drone 10, shown in FIG. 1, is released from either one of the two space vehicles, toward the other, from a hatch within which the drone normally is installed.

Drone 10 is equipped with a powerful electromagnet 11, a compressed gas propellant container 12 and control nozzles 13 mounted inside a small cylindrical housing 14, and an attachment line or cable 15. By using the compressed gas propellant, a crew member of the space vehicle launching drone 10, optically guides the drone to the other space vehicle using a manual "fly-by-wire" control system, until the drone is within a few feet of making actual, physical contact with the other space vehicle. At this point, the operating crew member energizes electromagnet 11, which automatically aligns itself and drone 10 with the other space vehicle, so that the drone attaches itself to the rendezvous drone of the other vehicle.

This stage of the final closing maneuver is shown in FIG. 2. Space vehicle 17 is the one from which drone 10 is launched and space vehicle 18 has received the drone in its hatch 19, where it has become attached to the rendezvous drone (not shown) of vehicle 18. Attachment cable 15, which was fed out from an electric motor driven mechanical winch (not shown), housed in space vehicle 17, while drone 10 was being guided into space vehicle 18, physically interconnects the two orbiting space vehicles. At this point the cable winch motor is energized to reel in cable 15 and vehicles 17 and 18 are slowly drawn together.

As the two space vehicles 17 and 18 are drawn together, the crew of either one of the two vehicles, say vehicle 18, energizes the electromechanical actuators 21, FIG. 3, which extend four mechanical fingers 22. The extending mechanical fingers 22 form a conical configuration, as shown, in front of the airlock 23.

Figure 4:
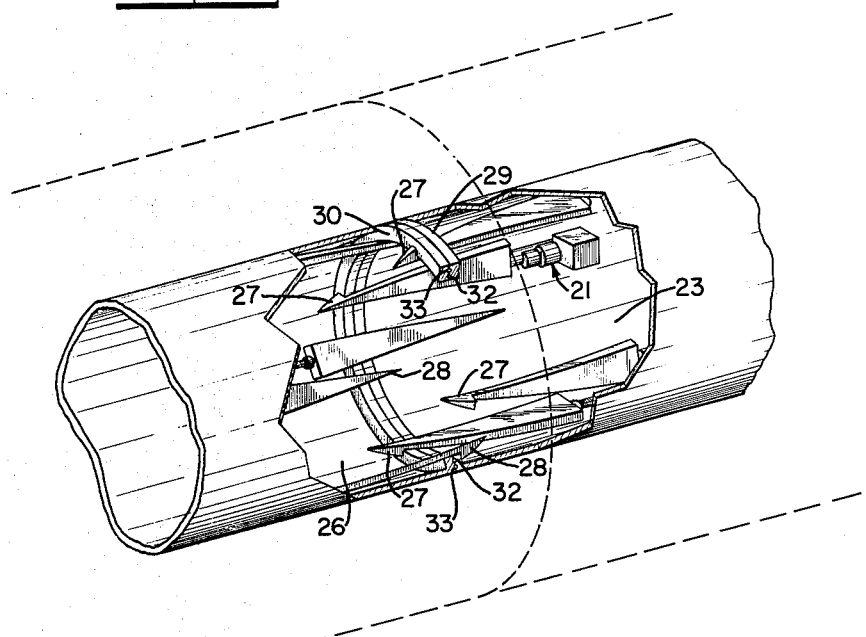
FIG. 4 is a similar view showing two space vehicles connected and sealed through their airlocks after final closing and docking, the vehicles being shown in phantom.

A set of four identical fingers 24, FIGS. 2 and 4, is installed in airlock 26 of space vehicle 17. Fingers 22 and 24 are arranged so that those of one vehicle exactly index with those of the other vehicle. In the extended positions of fingers 22 and 24, the tips of the fingers are cammed inboard, as best shown in FIG. 3, forming a conical aligning arrangement on one vehicle, say vehicle 18. The hatch of the other vehicle 17 serves as the aligning target. The fingers 24 of vehicle 17 are left inert, in a position which permits deflection within the hatch of vehicle 18. This deflection, plus inboard deflection of the extended fingers 22 of vehicle 18 tends to dampen impact loads due to any vehicle misalignment.

Thus automatic mechanical alignment and impact load damping are accomplished as orbiting space vehicles 17 and 18 are drawn together by reeling in cable 15, as described above. After the vehicles have been thus drawn together, both sets of mechanical fingers 22 and 24 are retracted by their respective mechanical actuators, as shown in FIG. 4. Hooks 27 and 28 on the ends of fingers 22 and 24, respectively, engage lockrings 30 and 29, respectively, as vehicles 17 and 18 are urged tightly together. Resilient seal rings 32 and 33 are compressed tightly together to hermetically seal the airlocks 23 and 26, as shown in FIG. 4, to form a pressure-tight seal between the airlocks.

Each of the actuators of the sets of fingers 22 and 24 is provided with a torque-limiting ratchet system (not shown) which provides even draw-up pressure around the seal rings 32 and 33. When seal rings 32 and 33 are evenly compressed, the finger actuators are stopped and locked, and the electromagnet 11 of drone 10 is deenergized. Then the drone is retracted to its normal position in the hatch of space vehicle 17. The drones and winches are housed in the airlock hatches and the fingers are located around the inside walls of the airlocks of the space vehicles. When the space vehicles are docked and hermetically sealed together, the airlocks of the vehicles are completely free of protrusions which might interfere with the movement of crewmen through the airlocks or crawl tubes. This arrangement also provides facilities for "in-flight" maintenance or repair of the final closure and docking system.

The sealed docking mechanism is normally released by simply reversing the direction of action of the finger actuators. In an emergency, however, explosive bolt type release (not shown) is incorporated as a back-up arrangement. The feature of universality of the final closing and docking system of the invention is achieved by installing the exact same system in all of the airlocks or crawl tubes of each of the orbiting space vehicles to be rendezvoused and docked. It will be seen that the docking system is lightweight and relatively simply in construction and operation.

Obviously, many modifications and variations of the orbital rendezvous, final closing and docking system of the present invention are possible in the light of the teachings given hereinabove. It is, therefore, to be understood that, within the scope of the appended claims, the invention can be practiced otherwise than as specifically described.

What is claimed is:

1. A final closure and docking system for orbiting space vehicles which compresses a rendezvous drone means adapted for launching from at least one of the space vehicles, attachment line means connected to the drone means and adapted for interconnecting the drone means and the drone launching space vehicle while the drone means is guided toward a second space vehicle, magnetic means mounted in the drone means adapted for establishing physical contact between the drone means and the second-mentioned space vehicle, and means for effecting a passageway between the two space vehicles including means for mutually interlocking said two space vehicles.

2. A final closure and docking system for orbiting space vehicle which comprises a rendezvous drone means adapted for launching from at least one of the space vehicles, attachment line means connected to the drone means and adapted for interconnecting the drone means and the drone launching space vehicle while the drone means is guided toward a second space vehicle, magnetic means mounted in the drone means adapted for establishing physical contact between the drone means and the second-mentioned space vehicle, and finger means extensibly mounted in airlock means of the orbiting space vehicles, said finger means being arranged for indexing with each other during docking of the space vehicles and adapted for tightly engaging the space vehicles and for tightly urging the airlock means of the vehicles together in structurally connected and communicating relationship.

3. A final closure and docking system for orbiting space vehicles which comprises a rendezvous drone means adapted for launching from at least one of the space vehicles, magnetic means mounted in the drone means for establishing physical contact between the drone means and a second space vehicle, propellant means mounted in the drone means for propelling the drone means from an orbiting drone means launching space vehicle to a second orbiting space vehicle in rendezvous relationship, cable means interconnecting the drone means and a launching space vehicle adapted for maintaining physical interconnection between the drone means and a launching vehicle during final closure and docking between two orbiting space vehicles in rendezvous relationship, and finger means extensibly mounted in airlock means of the orbiting space vehicles, said finger means being arranged for indexing with each other during docking of the space vehicles and adapted for tightly engaging the space vehiclues and for tightly urging the airlock means of the vehicles together in structurally connected and communicating relationship.

4. A final closure and docking system for orbiting space vehicles which comprises a rendezvous drone means adapted for launching from at least one of the space vehicles, attachment line means connected to the drone means and adapted for interconnecting the drone means and the drone launching space vehicle while the drone means is guided toward a second space vehicle, magnetic means mounted in the drone means adapted for establishing physical contact between the drone means and the second-mentioned space vehicle, and means for interlocking the two space vehicles in communicating relationship, said interlocking means including finger means extensibly mounted in airlock means of the orbiting space vehicles.

References Cited by the Examiner

UNITED STATES PATENTS 2,359,964   10/44   Barnett _____ 114—16.8

OTHER REFERENCES

Astronautics Magazine, June 1961, page 32.

FERGUS S. MIDDLETON, *Primary Examiner.*

RALPH D. BLAKESLEE, MILTON BUCHLER,
*Examiners.*